United States Patent
Savant (10) Patent No.: US 9,450,764 B1
(45) Date of Patent: Sep. 20, 2016

(54) SYSTEMS AND METHODS FOR VALIDATING SELF-SIGNED CERTIFICATES

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 295 days.

(21) Appl. No.: 14/024,638

(22) Filed: Sep. 12, 2013

(51) Int. Cl.
   *H04L 9/32* (2006.01)
(52) U.S. Cl.
   CPC .................................. *H04L 9/3263* (2013.01)
(58) Field of Classification Search
   CPC ... H04L 9/3247; G06F 21/10; G06F 21/105; G06F 21/44
   See application file for complete search history.

(56) References Cited

U.S. PATENT DOCUMENTS

| | | | |
|---|---|---|---|
| 2007/0038853 A1* | 2/2007 | Day | H04L 63/0281 713/153 |
| 2009/0089290 A1* | 4/2009 | Nachenberg | G06F 21/51 |
| 2012/0198543 A1* | 8/2012 | Rogers | H04L 63/0823 726/17 |
| 2014/0373097 A1* | 12/2014 | Thayer | H04L 63/0823 726/4 |

OTHER PUBLICATIONS

Jun Mao; Systems and Methods for Validating Application Signatures; U.S. Appl. No. 14/020,319, filed Sep. 6, 2013.
"Trialware: Symantec Mobile Security 7.2", https://www4.symantec.com/Vrt/offer?a_id=141355, as accessed Jun. 29, 2013, Symantec Corporation, (Jun. 9, 2013).
"Lookout", https://www.lookout.com/, as accessed Jun. 29, 2013, (Jan. 2, 1997).
"Trend Micro", http://www.trendmicro.com/us/index.html, as accessed Jun. 29, 2015, (Jan. 23, 2012).
"McAfee", http://www.mcafee.com/us/, as accessed Jun. 29, 2015, (Feb. 29, 2000).

* cited by examiner

*Primary Examiner* — Saleh Najjar
*Assistant Examiner* — Devin Almeida
(74) *Attorney, Agent, or Firm* — ALG Intellectual Property, LLC (57) ABSTRACT

A computer-implemented method for validating self-signed certificates may include (1) identifying a self-signed certificate associated with an application, (2) identifying a publisher allegedly responsible for publishing the application, (3) identifying a website associated with the publisher allegedly responsible for publishing the application, (4) determining that the website references the application, (5) determining that a website certificate associated with the website has been signed by a certificate authority, and (6) validating the self-signed certificate in response to determining both that the website references the application and that the website certificate associated with the website has been signed by the certificate authority. Various other methods, systems, and computer-readable media are also disclosed.

18 Claims, 6 Drawing Sheets

SYSTEMS AND METHODS FOR VALIDATING SELF-SIGNED CERTIFICATES

BACKGROUND

Application distribution platforms, such as the GOOGLE PLAY store, often require application publishers to provide a digital certificate that identifies the publisher of an application. While some application distribution platforms require that these digital certificates be countersigned by a trusted third party, such as a certificate authority, others do not. Unfortunately, the use of self-signed certificates (i.e., certificates that have not been countersigned by a trusted third party) may introduce a variety of security issues.

For example, customers interested in downloading and/or installing an application signed using a self-signed certificate may be unable to verify that the application actually originates from its stated publisher since the application's source of origin has not been verified by a trusted third party. This may in turn allow malicious developers to publish malware under the name of legitimate entities, such as financial institutions, in an attempt to lure unsuspecting customers to download the same.

Self-signed certificates may also fail to provide a way for customers to determine whether an application's publisher represents an entity that should be trusted since the legitimacy or trustworthiness of this publisher has not been verified by a trusted third party. Unfortunately, this may allow malicious developers to publish malware under new (and ever-changing) identities in an attempt to avoid detection.

As such, the instant disclosure identifies and addresses a need for systems and methods for validating self-signed certificates.

SUMMARY

As will be described in greater detail below, the instant disclosure generally relates to systems and methods for using third-party-signed website certificates to validate self-signed certificates. In one example, a computer-implemented method for accomplishing such a task may include (1) identifying a self-signed certificate associated with an application, (2) identifying a publisher allegedly responsible for publishing the application, (3) identifying a website associated with the publisher allegedly responsible for publishing the application, (4) determining that the website references the application, (5) determining that a website certificate associated with the website has been signed by a certificate authority, and then (6) validating the self-signed certificate in response to determining both that the website references the application and that the website certificate associated with the website has been signed by the certificate authority.

In some examples, identifying the publisher's name may include identifying the publisher's name within the self-signed certificate and/or within the application's file name. In addition, identifying the website may include identifying metadata within the self-signed certificate that identifies the publisher and/or that identifies the website. Identifying the website may also include performing, using the publisher's name, a web search for the website. Additionally or alternatively, identifying the website may include identifying, on an application distribution platform that hosts the application, a link to the website.

In some embodiments, determining that the website references the application may include determining that the website hosts the application for download and/or determining, by crawling the website, that the website contains a link to an application distribution platform that hosts the application. In these embodiments, crawling the website may include ignoring content within the website created by external entities. In one example, the computer-implemented method may also include, upon validating the self-signed certificate, providing a certificate that verifies the validity of the self-signed certificate to the publisher and/or to an application distribution platform that hosts the application.

The computer-implemented method may also include (1) identifying an additional self-signed certificate associated with an additional application, (2) identifying an additional publisher allegedly responsible for publishing the additional application, and (3) identifying an additional website associated with the additional publisher identified in the additional self-signed certificate. In addition, the computer-implemented method may include determining that the additional website does not reference the additional application and determining, based at least in part on the determination that the additional website does not reference the additional application, that the additional publisher is not responsible for publishing the additional application. The computer-implemented method may also include performing a security action in response to determining that the additional publisher is not responsible for publishing the additional application.

In one embodiment, a system for implementing the above-described method may include an (1) identification module that identifies (i) a self-signed certificate associated with an application, (ii) a publisher allegedly responsible for publishing the application, and (iii) a website associated with the publisher allegedly responsible for publishing the application, (2) a website analysis module that determines that the website references the application, (3) a certificate analysis module that determines that a website certificate associated with the website has been signed by a certificate authority, and (4) a validation module that validates the self-signed certificate in response to determining both that the website references the application and that the website certificate associated with the website has been signed by the certificate authority. The system may also include one or more processors that execute the identification module, the website analysis module, the certificate analysis module, and the validation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a self-signed certificate associated with an application, (2) identify a publisher allegedly responsible for publishing the application, (3) identify a website associated with the publisher allegedly responsible for publishing the application, (4) determine that the website references the application, (5) determine that a website certificate associated with the website has been signed by a certificate authority, and (6) validate the self-signed certificate in response to determining both that the website references the application and that the website certificate associated with the website has been signed by the certificate authority.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using third-party-signed website certificates to validate self-signed certificates. As will be explained in greater detail below, by determining that a publisher's website contains a link to or otherwise references an application hosted by an application distribution platform, the systems and methods described herein may be able to verify that the publisher is in fact the author of the application in question. In addition, by determining that the publisher's website has been issued a digital certificate by a trusted third party (such as a certificate authority), these systems and methods may be able to determine that the publisher represents a trusted entity. This may in turn enable both the application distribution platform and customers of this platform to verify that applications that have been signed using self-signed certificates issued by the publisher may be trusted.

Figure 1:
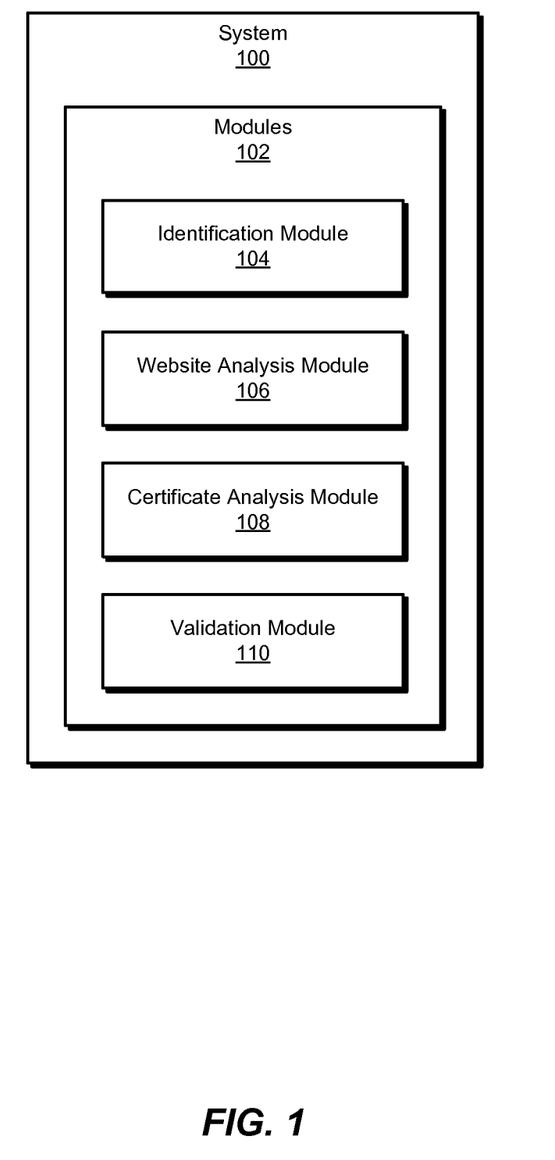
FIG. 1 is a block diagram of an exemplary system for validating self-signed certificates.
Figure 2:
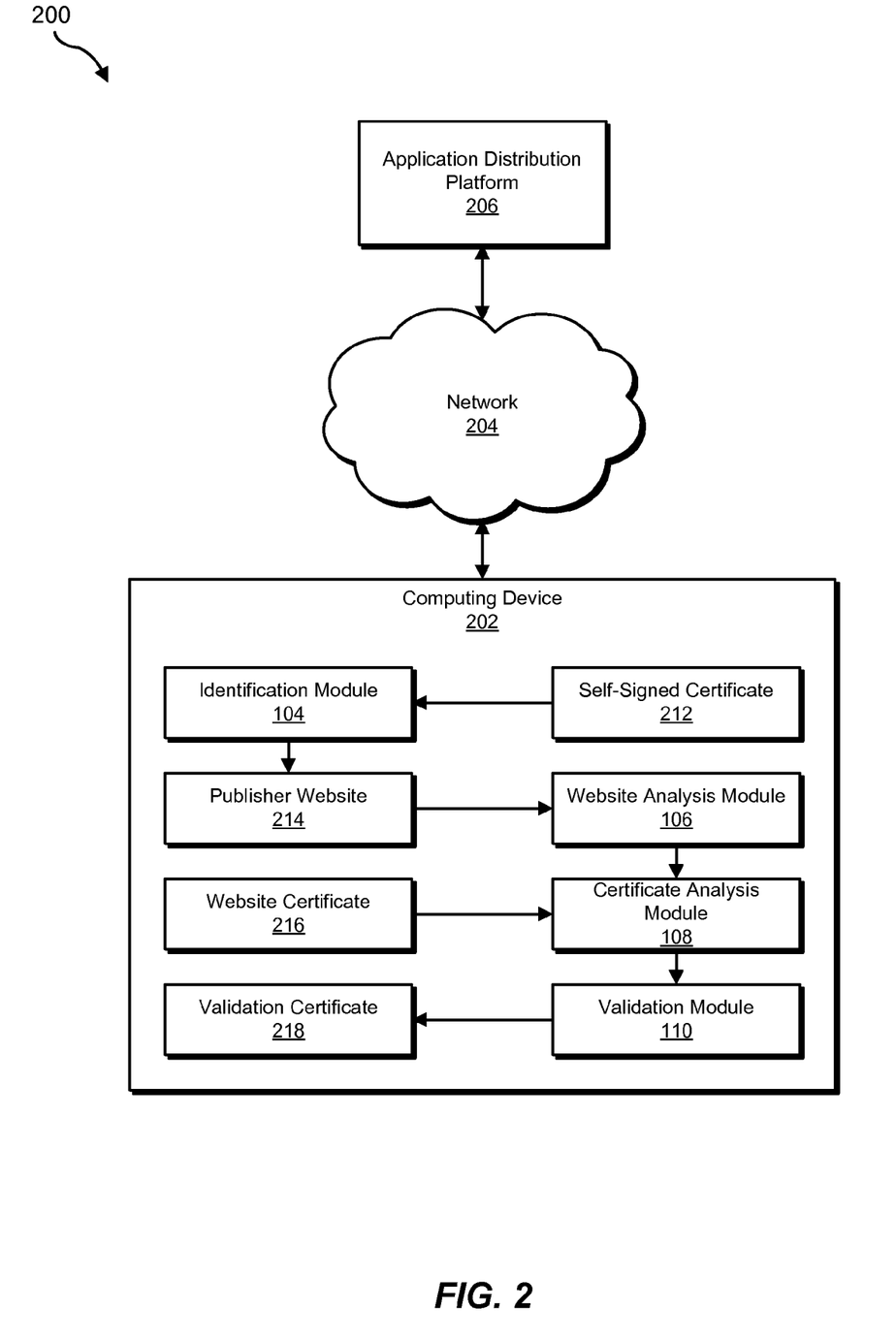
FIG. 2 is a block diagram of an exemplary system for validating self-signed certificates.

The following will provide, with reference to FIGS. 1-2, detailed descriptions of exemplary systems for validating self-signed certificates. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for validating self-signed certificates. As illustrated in this figure, exemplary system 100 may include one or more modules 102 for performing one or more tasks. For example, and as will be explained in greater detail below, exemplary system 100 may include an identification module 104 that identifies (1) a self-signed certificate associated with an application, (2) a publisher allegedly responsible for publishing the application, and (3) a website associated with the publisher. Exemplary system 100 may also include a website analysis module 106 that determines that the website contains a link to or otherwise references the application.

In addition, and as will be described in greater detail below, exemplary system 100 may include a certificate analysis module 108 that determines that a website certificate associated with the website has been signed by a certificate authority. Exemplary system 100 may also include a validation module 110 that validates the self-signed certificate in response to determining both that the website references the application and that the website certificate associated with the website has been signed by the certificate authority. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or application distribution platform 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an application distribution platform 206 via a network 204. In one example, computing device 202 may be programmed with one or more of modules 102. Additionally or alternatively, application distribution platform 206 may be programmed with one or more of modules 102.

In one embodiment, one or more of modules 102 from FIG. 1 may, when executed by at least one processor of computing device 202 and/or application distribution platform 206, facilitate computing device 202 and/or application distribution platform 206 in validating self-signed certificates. For example, and as will be described in greater detail below, one or more of modules 102 may cause computing device 202 to (1) identify a self-signed certificate (e.g., self-signed certificate 212) associated with an application, (2) identify a publisher allegedly responsible for publishing the application, (3) identify a website (e.g., publisher website 214) associated with the publisher allegedly responsible for publishing the application, (4) determine the website references the application, (5) determine that a website certificate (e.g., website certificate 216) associated with the website has been signed by a certificate authority, and then (6) validate the self-signed certificate in response to determining both that the website references the application and that the website certificate associated with the website has been signed by the certificate authority.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing device 202 may be owned or operated by an end user (e.g., a customer of application distribution platform 206) and/or by a security developer responsible for determining the trustworthiness of applications hosted by application distribution platform 206.

Application distribution platform 206 generally represents any type or form of service capable of digitally distributing computer software. Examples of application distribution platform 206 include, without limitation, mobile application stores (such as GOOGLE PLAY, the APPLE APP STORE, the WINDOWS PHONE STORE, and/or the AMAZON APPSTORE), non-mobile application stores (such as the WINDOWS STORE), and any other service or platform capable of digitally distributing computer software.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and application distribution platform 206.

Figure 3:
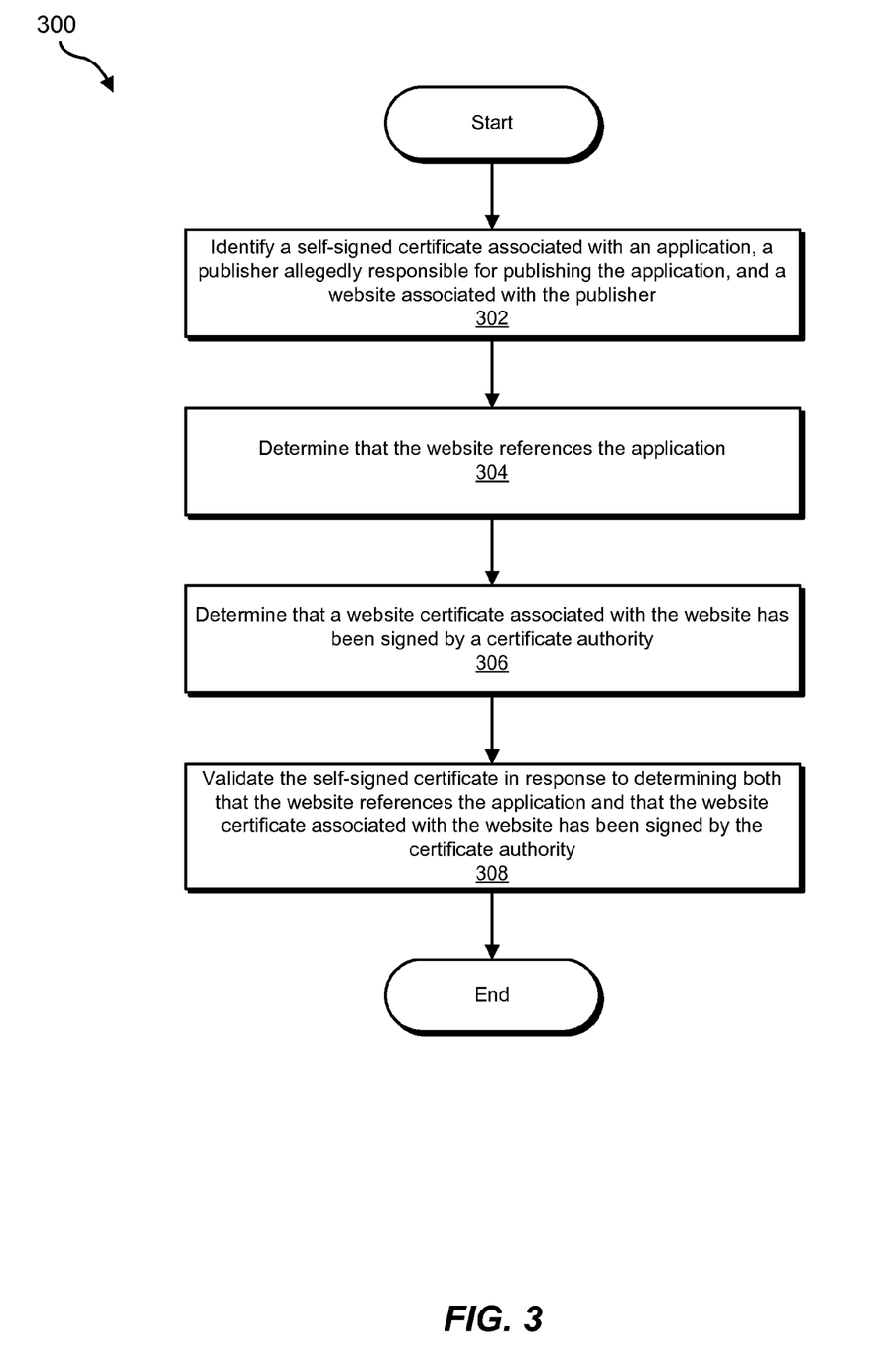
FIG. 3 is a flow diagram of an exemplary method for validating self-signed certificates.

FIG. 3 is a flow diagram of an exemplary computer-implemented method 300 for validating self-signed certificates. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a self-signed certificate associated with an application. For example, identification module 104 may, as part of computing device 202 in FIG. 2, identify a self-signed certificate 212 associated with an application hosted for download by application distribution platform 206.

The phrase "digital certificate" (or simply "certificate"), as used herein, generally refers to any type or form of electronic document used to verify the identity of an entity. Digital certificates may be self-signed and/or signed by trusted third parties, commonly known as "certificate authorities." The term "self-signed certificate," as used herein, generally refers to a digital certificate that has been signed by the same entity whose identity it certifies (i.e., a "self-signed certificate" may refer to a digital certificate that has not been signed by a certificate authority). A third-party-signed certificate, in contrast, may refer to a digital certificate that uses a third-party's digital signature (e.g., the digital signature of a certificate authority) to bind the public half of an asymmetric cryptographic key pair associated with an entity with information that uniquely identifies the entity.

In addition, the term "application," as used herein, generally refers to any type or form of computer-readable instructions capable of directing the processor of a computing device to perform specific operations. Examples of applications include, without limitation, mobile applications (such as GOOGLE ANDROID applications, APPLE IOS applications, WINDOWS PHONE applications, etc.) and non-mobile applications (such as WINDOWS applications, MAC applications, etc.).

Figure 4:
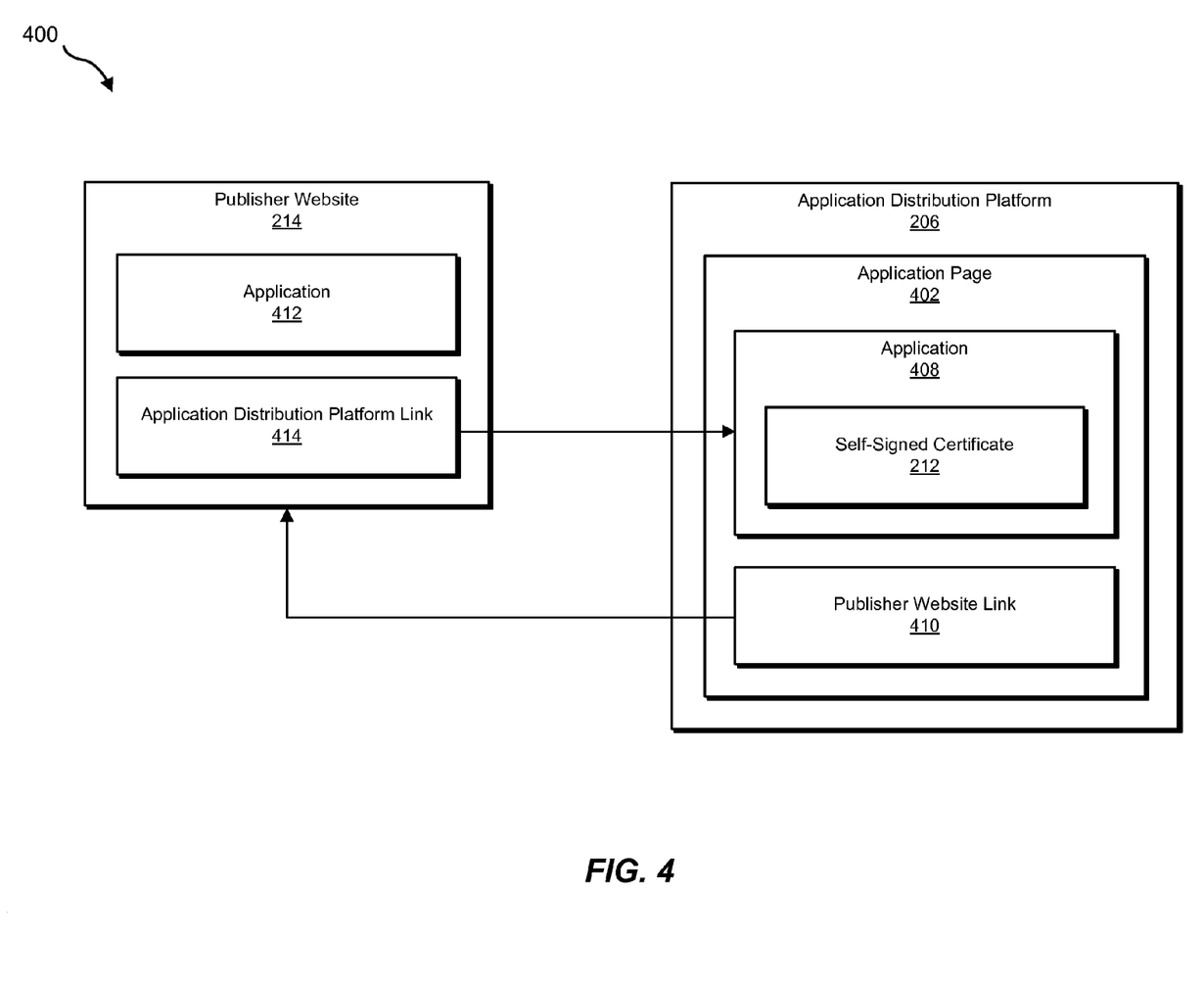
FIG. 4 is a block diagram of an exemplary publisher website that may be used to validate a self-signed certificate associated with an application hosted on an application distribution platform.

The systems described herein may perform step 302 in a variety of ways. In one example, identification module 104 may identify self-signed certificate 212 upon downloading an application signed with self-signed certificate 212 from application distribution platform 206 to computing device 202. Additionally or alternatively, identification module 104 may identify self-signed certificate 212 upon detecting an attempt to upload or add a new application signed with self-signed certificate 212 to application distribution platform 206. Identification module 104 may also identify self-signed certificate 212 by scanning application distribution platform 206 for applications signed with self-signed certificate 212. Specifically, and as illustrated in FIG. 4, identification module 104 may identify self-signed certificate 212 included with an application 408 contained within an application page 402 hosted by application distribution platform 206.

In some examples, the systems described herein may, upon identifying the self-signed certificate associated with the application, also identify a publisher allegedly responsible for publishing the application. The term "publisher," as used herein, generally refers to an individual or entity responsible for authoring, creating, developing, publishing, and/or distributing an application for download.

The systems described herein may identify the publisher allegedly responsible for publishing the application in a variety of ways. In some examples, identification module 104 may identify the publisher's name within the self-signed certificate itself. For example, identification module 104 may identify metadata contained within self-signed certificate 212 that specifies the publisher's name. Additionally or alternatively, identification module 104 may identify the publisher's name by determining that the application's file name (e.g., "com.symantec.1259") contains the publisher's name (in this example, "SYMANTEC").

In some embodiments, the systems described herein may, upon identifying the publisher allegedly responsible for publishing the application, also identify a website associated with the publisher. The systems described herein may identify a website associated with the publisher in a variety of ways. For example, identification module 104 may identify publisher website 214 by identifying metadata within self-signed certificate 212 that specifies publisher website 214. Identification module 104 may also identify publisher website 214 by performing, using the publisher's name, a web search for publisher website 214. In addition, identification module 104 may identify publisher website 214 by identifying, on application distribution platform 206, a link (e.g., publisher website link 410 in FIG. 4) to publisher website 214.

Returning to FIG. 3, at step 304 the systems described herein may determine that the website identified in step 302 references the application. For example, website analysis module 106 may, as part of computing device 202 in FIG. 2, determine that publisher website 214 references the application in question.

The systems described herein may perform step 304 in a variety of ways. In one example, website analysis module 106 may determine that the website references the application (e.g., application 412 in FIG. 4) by determining that publisher website 214 hosts the application for download. Additionally or alternatively, website analysis module 106 may determine that the website references the application by determining, by crawling publisher website 214, that publisher website 214 contains a hyperlink (e.g., application distribution platform link 414 in FIG. 4) to the application (e.g., application 408) hosted on application distribution platform 206.

In some examples, the systems described herein may, when crawling the publisher's website, ignore content within the website that is created by external entities. For example, publisher website 214 may contain forums, user-generated pages or profiles, and/or advertisements. In this example, website analysis module 106 may ignore these portions of publisher website 214 when searching for application 412 and/or application distribution platform link 414 in order to decrease the time and processing power required to crawl publisher website 214 and/or more reliably or accurately identify application 412 and/or application distribution platform link 414.

Returning to FIG. 3, at step 306 the systems described herein may determine that a website certificate associated with the website identified in step 302 has been signed by a certificate authority. For example, certificate analysis module 108 may, as part of computing device 202 in FIG. 2, determine that a website certificate 216 associated with publisher website 214 has been signed by a known or trusted certificate authority.

The term "website certificate," as used herein, generally refers to a digital certificate used to verify the identity of an entity responsible for a website. Examples of website certificates include, without limitation, Transport Layer Security (TSL) certificates, Secure Socket Layer (SSL) certificates, Extended Validation SSL (EV SSL) certificates, etc. In addition, the term "certificate authority," as used herein, generally refers to a trusted entity responsible for issuing digital certificates. As detailed above, a digital certificate may certify the ownership of a public key by the named subject of the certificate. This may in turn allow others to rely upon signatures or assertions made by the private key that corresponds to the public key that is certified. In this so-called model of trust, a "certificate authority" may represent a trusted third party that is trusted by both the subject (i.e., owner) of the certificate and the party relying upon the certificate. In some examples, certificate authorities may also represent, or check with, a Registration Authority (RA) in order to verify information provided by a requestor of a digital certificate.

The systems described herein may perform step 306 in a variety of ways. For example, certificate analysis module 108 may, as part of a web browser installed on computing device 202, attempt to connect to publisher website 214. In response to this attempt, a server hosting publisher website 214 may provide a website certificate 216 for publisher website 214 to certificate analysis module 108. Information identifying the publisher of publisher website 214 may be contained within website certificate 216, which may have been encrypted with the private cryptographic key of a certificate authority. Certificate analysis module 108 may then use the public cryptographic key of this certificate authority to decrypt website certificate 216 to verify the identity of the publisher of publisher website 214.

At step 308, the systems described herein may validate the self-signed certificate in response to determining both that the website references the application and that the website certificate associated with the website has been signed by a certificate authority. For example, validation module 110 may, as part of computing device 202 in FIG. 2, validate self-signed certificate 212 in response to determining both that publisher website 214 references the application and that website certificate 216 has been signed by a trusted certificate authority.

The systems described herein may perform step 308 in a variety of contexts. In one example, computing device 202 may be owned and/or operated by a customer interested in downloading and/or installing the application (from, e.g., application distribution platform 206). In this example, validation module 110 may allow the owner of computing device 202 to download and/or install the application upon validation of the application's self-signed certificate. In another example, computing device 202 may be owned and/or operated by an entity responsible for vetting applications uploaded to application distribution platform 206. In this example, validation module 110 may validate the application's self-signed certificate before or after allowing the application to be uploaded to application distribution platform 206.

The systems described herein may also perform step 308 in a variety of ways. In one example, validation module 110 may validate the self-signed certificate by providing a verification certificate to the publisher and/or application distribution platform 206 that verifies that the application originates from a trusted source. For example, validation module 110 may issue a verification certificate that verifies that the application is "NORTON TRUSTED". In this example, application distribution platform 206 and/or customers of this platform may subsequently rely on this verification certificate as validation that the application originates from a trusted source.

In some examples, the systems described herein may also be used to detect imposter applications (e.g., applications claiming to be by published by an entity other than their true publisher) and/or illegitimate publishers. For example, if website analysis module 106 determines that a known publisher's website (such as the website of a trusted financial institution) does not contain a link to or otherwise reference an application hosted by application distribution platform 206 that is allegedly published by the publisher, then validation module 110 may determine that the publisher in question is not in fact responsible for publishing the application (i.e., that an imposter is attempting to publish applications under the publisher's name). Similarly, if website analysis module 106 determines that a publisher's website has not been issued a digital certificate by a trusted certificate authority, then validation module 110 may determine that the publisher (and, thus, applications published by the publisher) should not be trusted.

In some examples, the systems described herein may perform a security action in response to detecting an imposter application and/or an illegitimate publisher. For example, validation module 110 may direct computing device 202, as a device owned and/or operated by a user interested in downloading and installing an application, to warn the user of a potential threat and/or prevent the user from downloading and/or installing the application. Additionally or alternatively, validation module 110 may prevent the application from being uploaded to application distribution platform 206 and/or remove the application from application distribution platform 206.

The systems and methods disclosed herein may be implemented in a variety of ways and provide a number of advantages. For example, by verifying the validity of self-signed certificates, the systems and methods described herein may enable application distribution platforms to vet applications signed with such certificates before or after hosting them for download. In addition, even if an application is only signed by a self-signed certificate, embodiments of the instant disclosure may allow application distribution platforms to communicate to customers downloading and/or installing the application that the application is published by a trusted entity. The disclosed systems and methods may also allow application distribution platforms to detect applications published by entities other than their claimed publishers. In this way, users may be alerted to potential security threats from unsecure applications.

Figure 5:
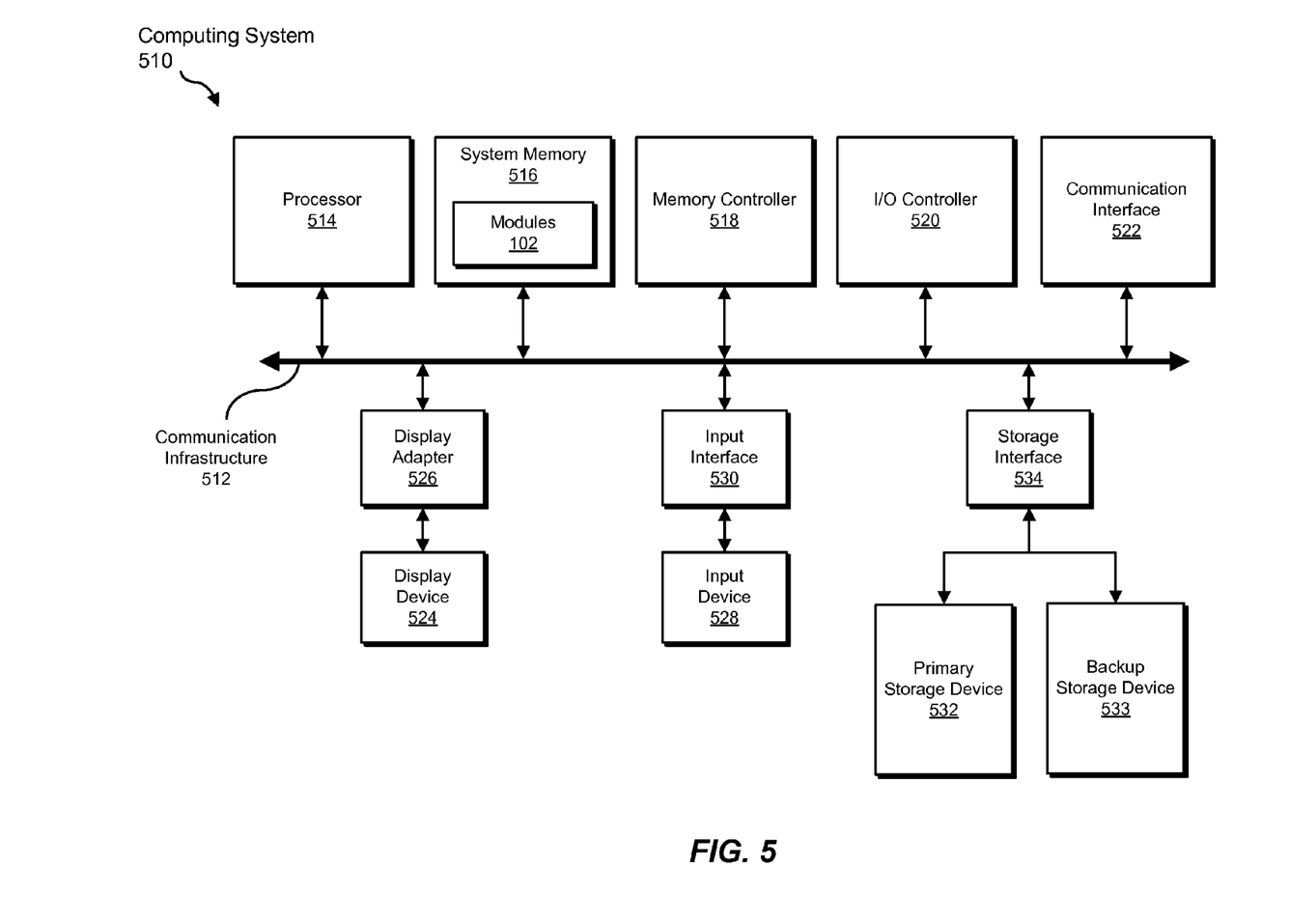
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
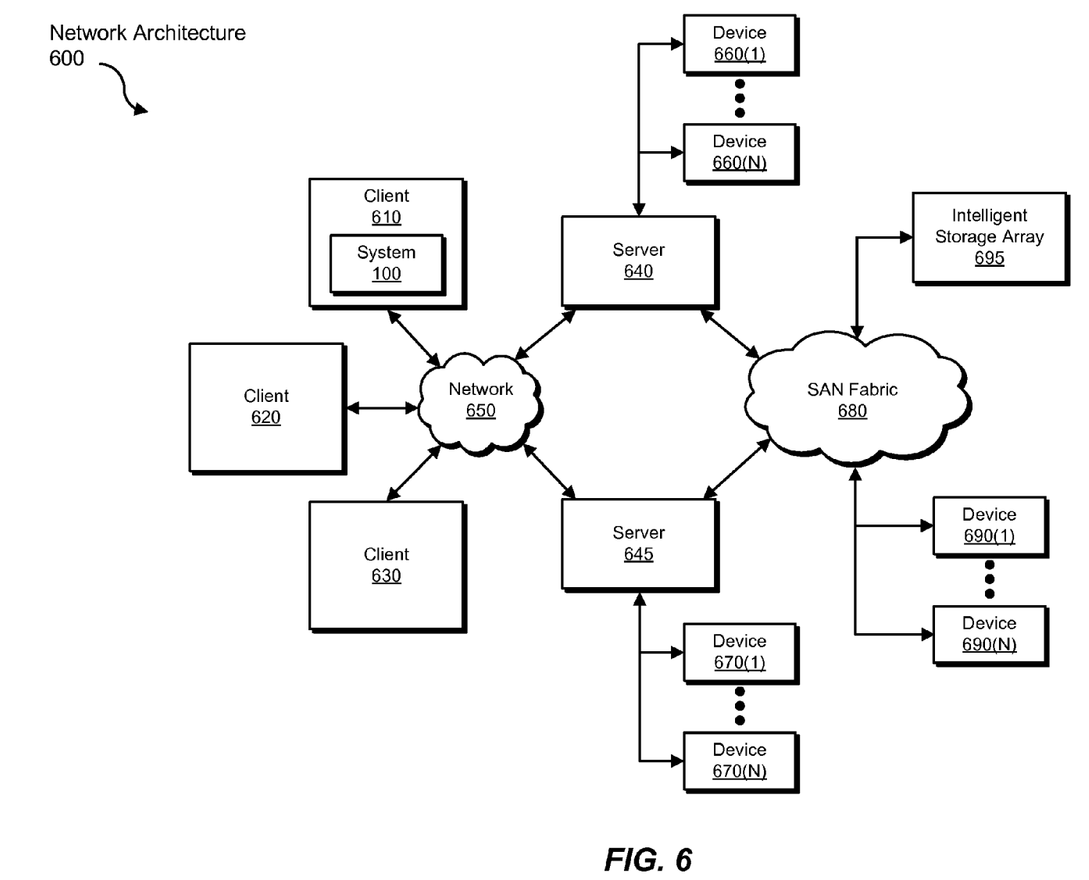
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for validating self-signed certificates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for validating self-signed certificates, at least a portion of the method being performed by a computing device comprising at least one processor, the method comprising:
   identifying a self-signed certificate associated with an application, wherein the self-signed certificate:
      certifies the identity of an entity;
      has been signed by the same entity whose identity is being certified, rather than a third-party certificate authority;
   identifying a publisher allegedly responsible for publishing the application;
   identifying a website associated with the publisher allegedly responsible for publishing the application;
   determining that the website references the application by:
      crawling the website for a reference to the application while ignoring content within the website created by external entities;
      while crawling the website, determining that the website contains a link to an application distribution platform that hosts the application;
   determining that a website certificate associated with the website has been signed by a certificate authority;
   validating the self-signed certificate in response to determining both that the website references the application and that the website certificate associated with the website has been signed by the certificate authority.

2. The method of claim 1, wherein identifying the publisher comprises at least one of:
   identifying the publisher's name within the self-signed certificate;
   identifying the publisher's name within the application's file name.

3. The method of claim 1, wherein identifying the website comprises at least one of:
   identifying metadata within the self-signed certificate that identifies at least one of:
      the publisher;
      the website;
   performing, using the publisher's name, a web search for the website;
   identifying, on an application distribution platform that hosts the application, a link to the website.

4. The method of claim 1, wherein determining that the website references the application further comprises determining that the website hosts the application for download.

5. The method of claim 1, further comprising, upon validating the self-signed certificate, providing a certificate that verifies the validity of the self-signed certificate to at least one of:
   the publisher;
   an application distribution platform that hosts the application.

6. The method of claim 1, further comprising:
   identifying an additional self-signed certificate associated with an additional application;
   identifying an additional publisher allegedly responsible for publishing the additional application;
   identifying an additional website associated with the additional publisher identified in the additional self-signed certificate;
   determining that the additional website does not reference the additional application;
   determining, based at least in part on the determination that the additional website does not reference the additional application, that the additional publisher is not responsible for publishing the additional application;
   performing a security action in response to determining that the additional publisher is not responsible for publishing the additional application.

7. A system for validating self-signed certificates, the system comprising:
   an identification module that:
      identifies a self-signed certificate associated with an application, wherein the self-signed certificate:

certifies the identity of an entity;
has been signed by the same entity whose identity is being certified, rather than a third-party certificate authority;
identifies a publisher allegedly responsible for publishing the application;
identifies a website associated with the publisher allegedly responsible for publishing the application;
a website analysis module that determines that the website references the application by:
crawling the website for a reference to the application while ignoring content within the website created by external entities;
while crawling the website, determining that the website contains a link to an application distribution platform that hosts the application;
a certificate analysis module that determines that a website certificate associated with the website has been signed by a certificate authority;
a validation module that validates the self-signed certificate in response to the determination that both the website references the application and that the website certificate associated with the website has been signed by the certificate authority;
at least one hardware processor configured to execute the identification module, the website analysis module, the certificate analysis module, and the validation module.

8. The system of claim 7, wherein the identification module identifies the publisher by at least one of:
identifying the publisher's name within the self-signed certificate;
identifying the publisher's name within the application's file name.

9. The system of claim 7, wherein the identification module identifies the website by at least one of:
identifying metadata within the self-signed certificate that identifies at least one of:
the publisher;
the website;
performing, using the publisher's name, a web search for the website;
identifying, on an application distribution platform that hosts the application, a link to the website.

10. The system of claim 7, wherein the website analysis module further determines that the website references the application by determining that the website hosts the application for download.

11. The system of claim 7, wherein, upon validating the self-signed certificate, the validation module provides a certificate that verifies the validity of the self-signed certificate to at least one of:
the publisher;
an application distribution platform that hosts the application.

12. The system of claim 7, wherein:
the identification module:
identifies an additional self-signed certificate associated with an additional application;
identifies an additional publisher allegedly responsible for publishing the additional application;
identifies an additional website associated with the additional publisher identified in the additional self-signed certificate;
the website analysis module determines that the additional website does not reference the additional application;
the certificate analysis module determines, based at least in part on the determination that the additional website does not reference the additional application, that the additional publisher is not responsible for publishing the additional application;
the validation module performs a security action in response to determining that the additional publisher is not responsible for publishing the additional application.

13. A non-transitory computer-readable-storage medium comprising one or more computer-executable instructions that, when executed by at least one processor of a computing device, cause the computing device to:
identify a self-signed certificate associated with an application, wherein the self-signed certificate:
certifies the identity of an entity;
has been signed by the same entity whose identity is being certified, rather than a third-party certificate authority;
identify a publisher allegedly responsible for publishing the application;
identify a website associated with the publisher identified in the self-signed certificate;
determine that the website references the application by:
crawling the website for a reference to the application while ignoring content within the website created by external entities;
while crawling the website, determining that the website contains a link to an application distribution platform that hosts the application;
determine that a website certificate associated with the website has been signed by a certificate authority;
validate the self-signed certificate in response to determining both that the website references the application and that the website certificate associated with the website has been signed by the certificate authority.

14. The computer-readable-storage medium of claim 13, wherein the one or more computer-executable instructions cause the computing device to identify the publisher by at least one of:
identifying the publisher's name within the self-signed certificate;
identifying the publisher's name within the application's file name.

15. The computer-readable-storage medium of claim 13, wherein the one or more computer-executable instructions cause the computing device to identify the website by at least one of:
identifying metadata within the self-signed certificate that identifies at least one of:
the publisher;
the website;
performing, using the publisher's name, a web search for the website;
identifying, on an application distribution platform that hosts the application, a link to the website.

16. The computer-readable-storage medium of claim 13, wherein the one or more computer-executable instructions cause the computing device to further determine that the website references the application by determining that the website hosts the application for download.

17. The computer-readable-storage medium of claim 13, wherein the one or more computer-executable instructions cause the computing device, upon validating the self-signed certificate, to provide a certificate that verifies the validity of the self-signed certificate to at least one of:
the publisher;
an application distribution platform that hosts the application.

18. The computer-readable-storage medium of claim 13, wherein the one or more computer-executable instructions cause the computing device to:
- identify an additional self-signed certificate associated with an additional application;
- identify an additional publisher allegedly responsible for publishing the additional application;
- identify an additional website associated with the additional publisher identified in the additional self-signed certificate;
- determine that the additional website does not reference the additional application;
- determine, based at least in part on the determination that the additional website does not reference the additional application, that the additional publisher is not responsible for publishing the additional application;
- perform a security action in response to determining that the additional publisher is not responsible for publishing the additional application.

* * * * *